(12) United States Patent
Woolvine et al.

(10) Patent No.: US 11,839,011 B2
(45) Date of Patent: Dec. 5, 2023

(54) STATIC DISSIPATIVE FLOORING SYSTEM

(71) Applicants: !OBAC Limited, Guernsey (GB);
Thomas J. Lutz, Wheaton, IL (US)

(72) Inventors: Paul Woolvine, Eastleigh (GB);
Thomas J. Lutz, Wheaton, IL (US)

(73) Assignees: !OBAC Limited, Guernsey (GB);
Thomas J. Lutz, Wheaton, IL (US)

( * ) Notice: Subject to any disclaimer, the term of this patent is extended or adjusted under 35 U.S.C. 154(b) by 82 days.

(21) Appl. No.: 17/436,708

(22) PCT Filed: Feb. 28, 2020

(86) PCT No.: PCT/EP2020/055346
§ 371 (c)(1),
(2) Date: Sep. 7, 2021

(87) PCT Pub. No.: WO2020/178197
PCT Pub. Date: Sep. 10, 2020

(65) Prior Publication Data
US 2022/0174804 A1    Jun. 2, 2022

(30) Foreign Application Priority Data
Mar. 7, 2019  (EP) .................................... 19161293

(51) Int. Cl.
*E04F 15/00*    (2006.01)
*H05F 3/02*    (2006.01)
(Continued)

(52) U.S. Cl.
CPC ................ *H05F 3/025* (2013.01); *C09J 9/02* (2013.01); *C09J 11/04* (2013.01); *C09J 175/04* (2013.01);
(Continued)

(58) Field of Classification Search
CPC .... H05F 3/025; H05F 3/00; H05F 3/06; C09J 9/02; C09J 11/04; C09J 11/00;
(Continued)

(56) References Cited

U.S. PATENT DOCUMENTS 4,724,187 A    2/1988  Ungar et al.
5,160,775 A *  11/1992 Yamada .................. H05F 3/025
428/95

(Continued)

FOREIGN PATENT DOCUMENTS

DE    19711473 A1    12/1997
EP    2206850 A1    7/2010

OTHER PUBLICATIONS

European Search Report dated Sep. 11, 2019 from corresponding European Patent Application No. 19161293; 8 pages.

(Continued)

*Primary Examiner* — Chi Q Nguyen
(74) *Attorney, Agent, or Firm* — Calderon, Safran & Cole P.C.

(57) ABSTRACT

A method of creating a magnetically adhered, static dissipative floor covering (1). The method comprises the steps of providing a magnetically receptive floor surface (3), and supplying a floor covering comprising a plurality of static dissipative, magnetic floor tiles (4). The tiles (4) are held in place by magnetic interaction between the tiles (4) and the magnetically receptive surface (3). The floor tiles (4) are of composite construction comprising a) a static dissipative vinyl wearing layer (5), b) an integral, conductive ground plane (6) and c) an integral, planar magnetic layer (7), The conductive ground plane (6) comprises a non-woven synthetic fabric (8) with a nickel-copper coating and a conductive adhesive backing (9). The conductive ground plane (6)

(Continued)

is bonded to the static dissipative wearing layer (5) by the conductive adhesive backing (9).

13 Claims, 4 Drawing Sheets

(51) Int. Cl.
    *C09J 9/02*     (2006.01)
    *C09J 11/04*     (2006.01)
    *C09J 175/04*     (2006.01)
    *E04F 15/02*     (2006.01)
    *E04F 15/10*     (2006.01)

(52) U.S. Cl.
    CPC ...... *E04F 15/02144* (2013.01); *E04F 15/107* (2013.01); *E04F 2290/048* (2013.01)

(58) Field of Classification Search
    CPC .. C09J 175/00; C09J 175/04; E04F 15/02144; E04F 15/00; E04F 15/107; E04F 15/10; E04F 2290/048
    See application file for complete search history.

(56) References Cited

U.S. PATENT DOCUMENTS

| | | | |
|---|---|---|---|
| 5,271,200 A | 12/1993 | Witt | |
| 5,348,784 A * | 9/1994 | Lampert | D04H 1/42 428/95 |
| 11,485,470 B2 * | 11/2022 | Moupfouma | H05F 3/025 |
| 11,607,846 B2 * | 3/2023 | Coward | B33Y 10/00 |
| 2005/0202160 A1 * | 9/2005 | Aisenbrey | H05K 3/101 427/126.1 |
| 2005/0233230 A1 * | 10/2005 | Carmichael | G03G 7/0006 430/69 |
| 2005/0266208 A1 * | 12/2005 | Raychaudhuri | C09D 183/02 428/143 |
| 2020/0248030 A1 * | 8/2020 | Dickens | C09D 7/61 |
| 2021/0017430 A1 * | 1/2021 | Dickens | C09J 7/38 |

OTHER PUBLICATIONS

International Search Report dated Jun. 2, 2020 from corresponding International Patent Application No. PCT/EP2020/055346; 12 pages.

* cited by examiner

STATIC DISSIPATIVE FLOORING SYSTEM

CROSS-REFERENCE TO RELATED APPLICATIONS AND CLAIM TO PRIORITY

This application is a national stage application of International Application No. PCT/EP2020/055346 filed Feb. 28, 2020, which claims priority to European Patent Application No. 19161293.6 filed Mar. 7, 2019, the disclosures of which are incorporated herein by reference and to which priority is claimed.

FIELD OF THE INVENTION

The invention relates to a method of creating a static dissipative floor covering.

BACKGROUND OF THE INVENTION

In critical environments the control of static electrical discharges can be imperative. These environments can include large areas as sensitive electronics manufacturing, aerospace and defense, medical equipment manufacturing, data centers etc. Static charges rising in such areas may degrade delicate components and/or cause product failures or loss of data in other situations. By convention, electrostatically dissipative (ESD) flooring systems are deployed in order to dissipate, or conduct away static charges generated in buildings or manufacturing environments that may otherwise be detrimental to the purposeful process of the area.

A variety of electrostatically dissipative (ESD) floor covering solutions are commercially available. Such solutions include carpet tiles, vinyl or rubber sheet and tile products and liquid applied, two-part thermosetting resin products, for example epoxy resin or polyurethane-based compositions. All such covering solutions commercially available are reliant on permanent adhesive bonding to the sub-floor. As an alternative, so-called "loose-lay" mechanically interlocking vinyl tile systems are also commercially available.

Portability becomes an important feature when considering that these manufacturing areas may regularly need to be re-configured, remodeled, expanded or moved around the facility based upon changing manufacturing processes or equipment. Moving heavy equipment over standard ESD tile flooring or over loose-lay/interlocking systems is frequently problematic. Standard adhesive bonded tiles, or resin flooring, can be damaged or loosened up from the floor under heavy point loads. Repairing these systems is time consuming and expensive, usually requiring specialist contractors to complete the work. Loose-lay/interlocking tiles often shift under these weight loads and then will not re-align correctly, resulting in impaired connectivity of the conductive system and rendering the floor ineffective. Thus, an industry need exists for a moveable ESD flooring product that does not exhibit the inherent functional drawbacks associated with conventional loose-lay interlocking systems.

SUMMARY OF THE INVENTION

It is an objective of the present invention to provide a method of creating a flooring system available without the disadvantages mentioned above.

This objective is realized by a method of creating a magnetically adhered, static dissipative floor covering which comprises the steps of:
  providing a magnetically receptive floor surface;
  providing a floor covering comprising a plurality of static dissipative, magnetic floor tiles, wherein the tiles are held in place by magnetic interaction between the tiles and the magnetically receptive surface.

The invention is based on the consideration that a magnetic interaction between the tiles and the magnetically receptive surface guarantees on one side a good and reliable fixation to the underground and allows on the other side an easy removal of the tiles from the floor surface as only magnetic forces must be counteracted because no firmly bonded or interlocking connection exists.

In one embodiment of the present invention, the floor surface is intrinsically magnetically receptive. Such an intrinsically magnetically receptive floor surface may be given for example in the case of steel raised access floors. Such floors comprise elements made of ferromagnetic steel which allows a direct interaction with magnetic floor tiles placed thereon.

In another embodiment of the invention, the floor surface is provided with a magnetically receptive underlayment. Concretely such a magnetically receptive underlayment may be formed by the application of a liquid coating composition comprising a polymeric binder and magnetic or magnetisable particles. Such coatings are well-known and commercially available.

For example, the polymeric binder of the coating composition may comprise an air-drying resin, in particular an acrylic, alkyd, epoxy-ester or vinyl resin.

Alternatively, the polymeric binder may comprise a two-part, thermosetting resin in particular an epoxy, polyurethane or polyurea resin. Preferably, the two-part, thermosetting resin comprises at least one aliphatic poly-isocyanate component and at least one poly-aspartic acid ester component.

The magnetic and/or magnetisable particles may be selected from paramagnetic, superparamagnetic and/or ferromagnetic substances, in particular selected from the group comprising iron, iron oxides, preferably mixed iron oxides with other metal oxides from the transition elements group like iron-nickel oxides, ferro-silicones or combinations thereof. Such magnetic or magnetisable particles allow an interaction with tiles placed on the magnetically receptive surface.

In a further elaboration of the invention the floor tiles are of composite construction comprising
  a static dissipative vinyl wearing layer,
  an integral, conductive ground plane and
  an integral, planar magnetic layer.

In other words the floor tiles comprise three basic elements, namely a resilient, electrostatically dissipative vinyl wearing layer, which forms the top surface being visible and being in contact with the environment. At the bottom of this surface an electrically conductive ground plane is provided which allows static charges draining down from the surface to be drained off in a lateral direction. On the underside of the conductive ground plane a planar magnetic layer is arranged which allows the magnetic interaction between the tiles and the magnetically receptive surface. The magnetic interaction between the floor coating and the tiles keeps the tiles fixed at their position. At the same time however, the tiles can easily be exchanged, for example if the wear surface is worn out or if the floor color shall simply be changed.

In a preferred embodiment of the invention, the static dissipative vinyl wearing layer has a resistivity from $10^6$ ohm.cm to $10^9$ ohm.cm according to the ASTM D257 standard. The ASTM D257 discloses a standard test for the measuring of the resistivity or the conductivity of insulating materials provided by the American Society for Testing and Materials. It should be noted that all values mentioned with reference to a standard or a technical code (ASTM D257, ASTM F390, Federal TM 101B) preferably refer to a version valid on Mar. 7, 2019. Furthermore, the static dissipative vinyl wearing layer may have a static decay time (5,000 volts-0 volts) of less than 0.10 seconds according to the Federal TM 101B, Method 4046 standard.

Alternatively, the static dissipative vinyl wearing layer may have a resistivity from $2.5 \times 10^4$ ohm.cm to $1 \times 10^6$ ohm.cm according to the ASTM D257 standard. In such a case the static dissipative vinyl wearing layer preferably has a static decay time (5,000 volts-0 volts) of less than 0.03 seconds according to the Federal TM 101B, Method 4046 standard. Such vinyl tiles are commercially available, for example from Desco Industries Inc. sold under the name 8400 Statguard ESD. The tiles available have preferably a thickness from 2 mm, in particular from 3 mm, to 5 mm, in particular to 3.5 mm. A thickness of tiles in such a range corresponds to standard thicknesses of commercially available tiles.

The conductive ground plane may comprise a non-woven synthetic fabric with a nickel-copper coating and a conductive adhesive backing. A nickel-copper coating on a non-woven synthetic fabric allows an efficient draining off of static charges. The nickel-copper coated fabric preferably has a thickness from 0.05 mm, in particular from 0.08 mm, to 0.25 mm, in particular to 0.10 mm. Such a thickness has been proven to be advantageous to achieve an efficient transmission of electrical charges.

The conductive ground plane can be bonded to the static dissipative vinyl wear layer by means of the conductive adhesive backing. Such a fabric which is pre-coated with a conductive adhesive facilitates the bonding of the conductive ground plane to the underside of the electrostatically dissipative vinyl wearing surface. Preferably the conductive adhesive is a pressure sensitive adhesive, which means that the bonding can be realized only by application of pressure forces.

In another embodiment of the invention, the conductive ground plane comprises a conductive adhesive or coating composition containing graphene powder. Preferably, the conductive adhesive or coating composition comprises a two-part, thermosetting polyurethane composition blended with graphene powder. The polyurethane composition preferably has a thickness from 0.10 mm, particularly preferred from 0.25 mm, to 1.0 mm, particularly preferred to 0.75 mm. The conductivity is realized by blending graphene powder which is in particular added from 5%, preferably from 10%, to 25%, preferably to 15% by weight.

Preferably, the conductive ground plane has a sheet resistivity from 0.01 ohm/sq. to 0.10 ohm/sq. according to the ASTM F390 standard. The ASTM F390 is a standard test method for the sheet resistivity of thin metallic films with a collinear four-probe array provided by the American Society for Testing and Materials. Preferably, the resistivity is in the range from 0.04 ohm/sq. to 0.06 ohm/sq. It has to be noted that the unit ohm/sq. is generally equivalent to the unit ohm. The addition /sq. indicates that not a classic volume resistivity is meant, but a sheet resistivity. A sheet resistivity in the range given allows an efficient draining off of a static charge.

The planar magnetic layer may comprise a flexible, polymeric magnetic sheet which is bonded to the conductive ground plane by means of an adhesive. Such a planar magnetic layer formed as a flexible, polymeric magnetic sheet being bonded to the underside of the conductive ground plane allows the magnetic interaction between the magnetic floor tiles and the magnetically receptive floor surface. A connection between the planar magnetic layer and the conductive ground plane by means of an adhesive presents an easy and simple way to manufacture static dissipative, magnetic floor tiles.

Preferably, the adhesive is a pressure sensitive adhesive. Such a pressure sensitive adhesive allows a simple application of the magnetic layer to the conductive ground plane as only pressure forces have to be applied to achieve a bonding.

In a further elaboration of the invention, the magnetic layer has a magnetic remanence from 0.10 Tesla, in particular from 0.15 Tesla, to 0.50 Tesla, in particular to 0.25 Tesla. Tesla is the standard unit for the magnetic flux density as it was previously Gauss which means that the magnetic layer may have a corresponding magnetic remanence from 1.000 Gauss, in particular from 1.500 Gauss, to 5.000 Gauss, in particular to 2.500 Gauss. The magnetic layer may have a coercivity from 39.750 Nm, in particular from 95.500 Nm, to 239.000 A/m, in particular to 175.000 A/m. These values correspond approximately to a magnetic coercivity from 500 Oersted, in particular from 1.200 Oersted, to 3.000 Oersted, in particular to 2.200 Oersted. Preferably, the magnetic layer has a thickness from 0.2 mm, in particular preferred from 0.4 mm, to 0.10 mm, in particular preferred to 0.6 mm. Such a thickness in combination with the magnetic properties given by the values of the magnetic remanence and the coercivity allow on one side a magnetic interaction between the floor coating and the tiles which keeps the tiles fixed at their position, and allow on the other side an easy removal of the tiles when they have to be changed.

According to a further aspect of the invention, the magnetically adhered, static dissipative floor covering system has a resistivity from $10^6$ ohm.cm to $10^9$ ohm.cm according to the ASTM D257 standard.

Furthermore, the magnetically adhered, static dissipative floor covering system may have a static decay time (5,000 volts-0 volts) of less than 0.10 seconds according to the Federal TM 101B, Method 4046 standard.

Alternatively, the magnetically adhered, static dissipative floor covering system can have a resistivity from $2.5 \times 10^4$ ohm.cm to $1 \times 10^6$ ohm.cm according to the ASTM D257 standard and/or a static decay time (5,000 volts-0 volts) of less than 0.03 seconds according to the Federal TM 101B, Method 4046 standard.

Such values for the resistivity and the static decay time allow an efficient draining off of static charges so that the risk of destruction or damages of delicate components is eliminated or at least reduced.

BRIEF DESCRIPTION OF THE DRAWINGS

Further characteristics and advantages of the present invention become clear by the following description of magnetically adhered, static dissipative floor coverings with reference to the enclosed drawing. There is FIG. 1 a schematic front side view of a floor covering according to the invention.

DETAILED DESCRIPTION OF THE PREFERRED EMBODIMENT(S)

Figure 1:
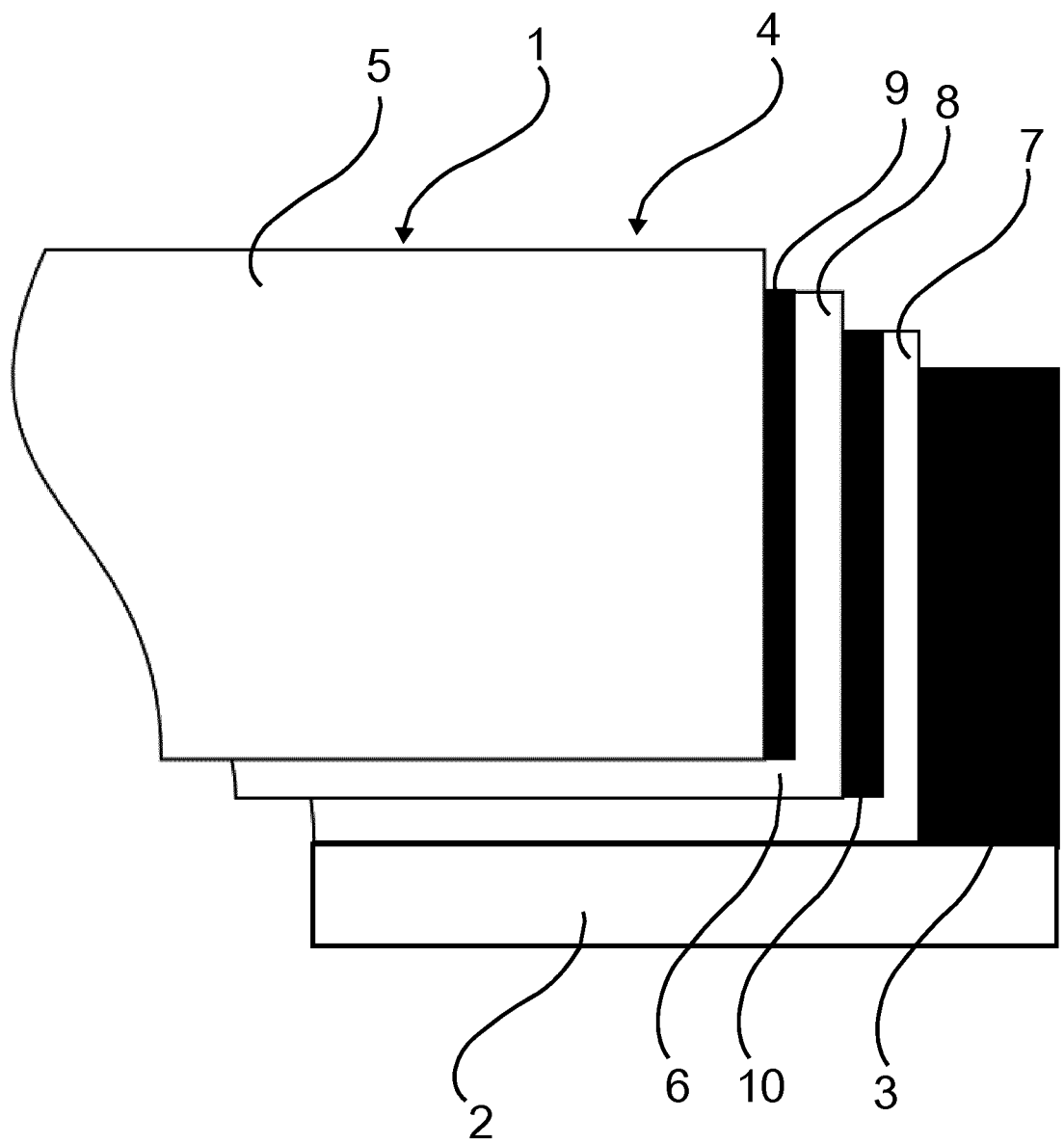
Figure 2:
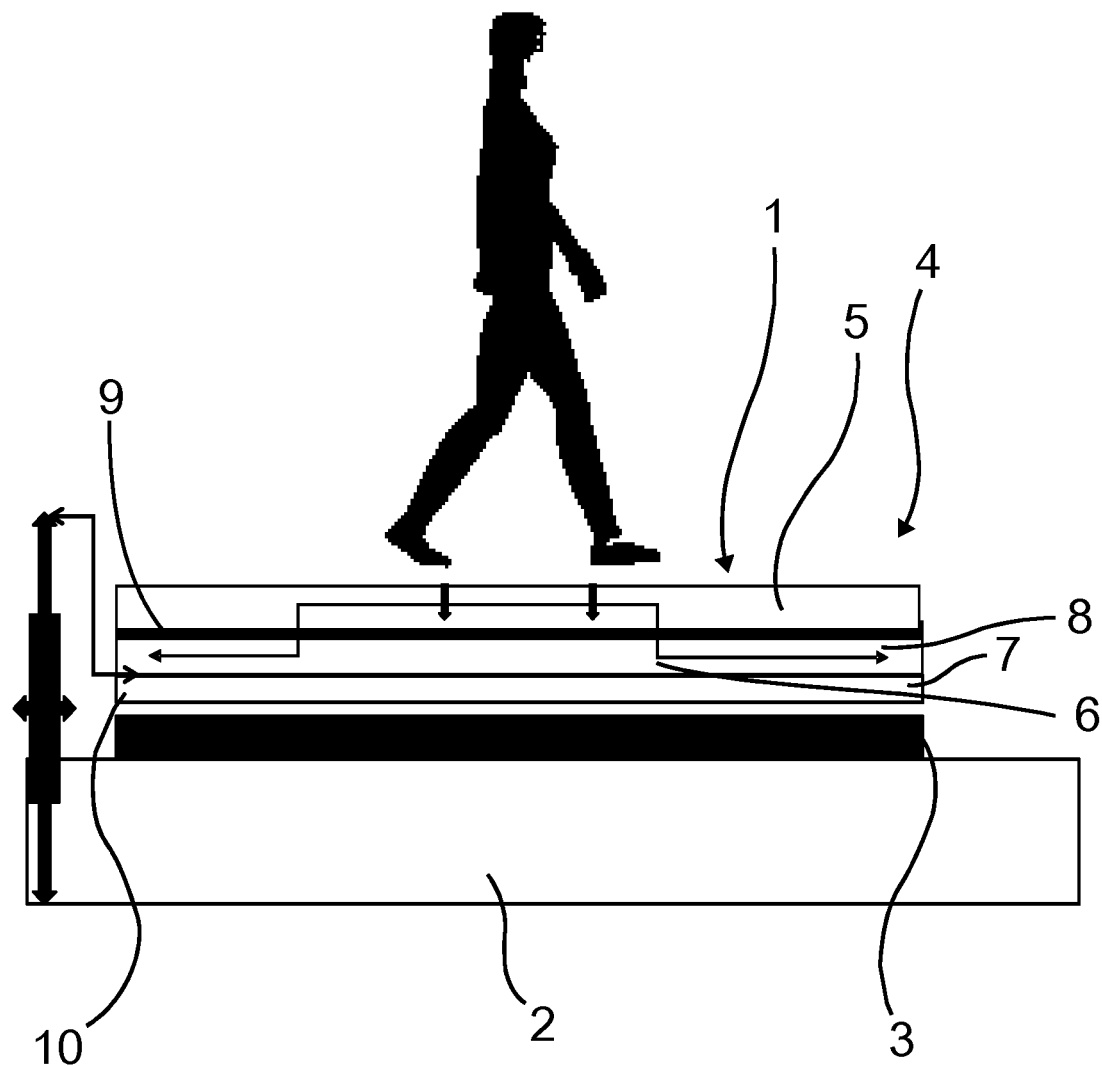
FIG. 2 a schematic cross-sectional view of the floor covering shown in FIG. 1.

FIGS. 1 and 2 show a magnetically adhered, static dissipative floor covering 1 which was created by a method according to the present invention and is applied to a substrate floor 2 which has a magnetically receptive surface 3.

The floor covering 1 is composed of static dissipative, magnetic floor tiles 4 which can be placed on the magnetically receptive surface 3. Concretely the floor tiles 4 are of composite construction comprising a static dissipative vinyl wearing layer 5, an integral, conductive ground plane 6 and an integral, planar magnetic layer 7.

The conductive ground plane 6 is formed by a non-woven synthetic fabric 8 with a nickel-copper coating and a conductive adhesive backing. Presently a conductive adhesive 9 is applied onto the copper-nickel coated fabric 8 which allows an efficient bonding to the static dissipative vinyl wearing layer 5 on top. Alternatively, the conductive ground plane 6 could also be formed by a conductive adhesive composition comprising in particular a two-part, thermosetting polyurethane composition blended with graphene powder.

On the underside of the nickel-copper-fabric 8 the magnetic layer 7 is bonded by means of an adhesive layer 10. The magnetic layer 7 ensures that the tiles deposited on the substrate floor, respectively the magnetically receptive surface 3 are fixed at their position due to the magnetic interaction. At the same time the tiles 4 can easily be exchanged.

In FIG. 2 it is visible how a static charge applied by a person 11 walking on the floor covering 1 is drained off. As the arrows show the static charge is transmitted via the vinyl wearing layer 5 and the adhesive 9 on top of the nickel-copper-fabric 8 to the latter, drained to the sides before a connection of the conductive ground plane 6 to the substrate floor 2 ensures that the charge is drained to the building.

Figure 4:
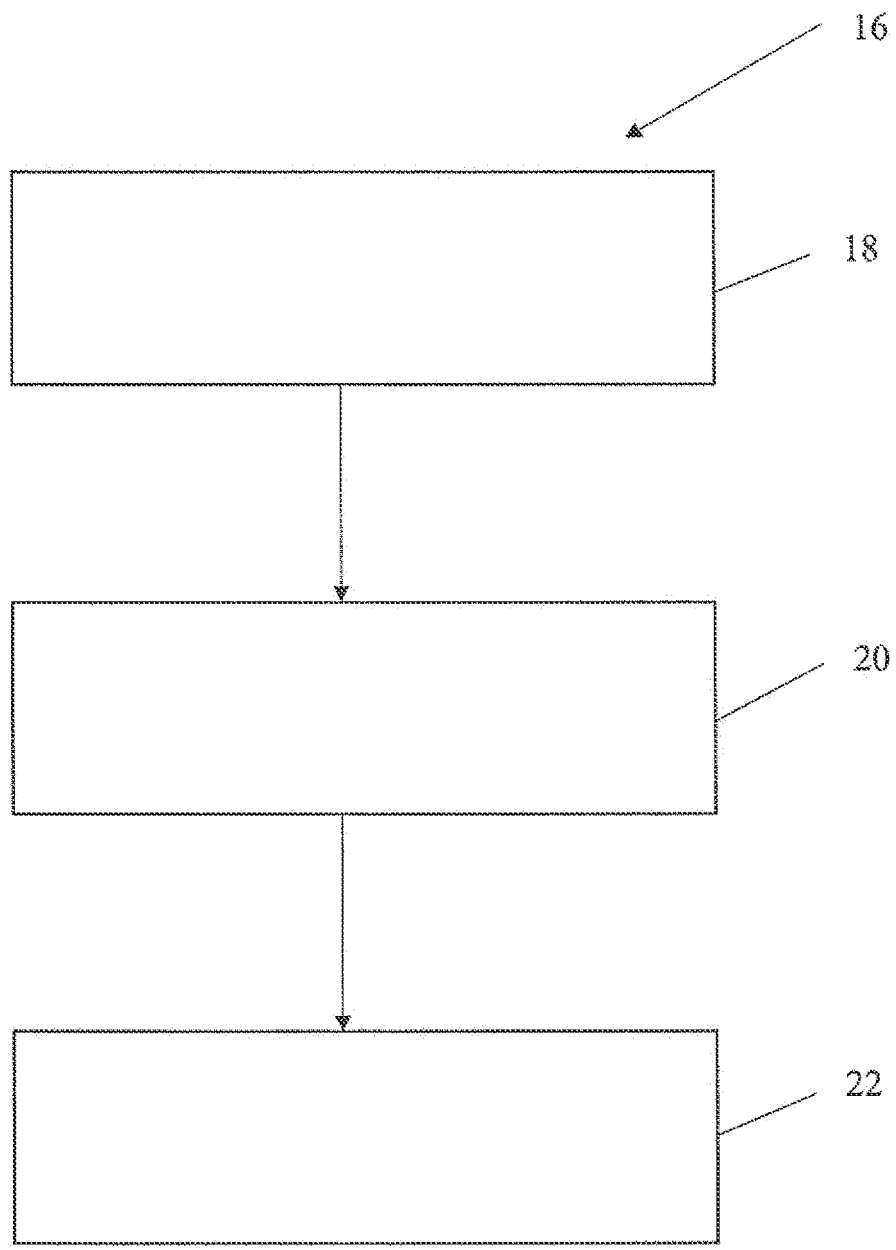
FIG. 4 is a flowchart of an exemplary method of creating a magnetically adhered, static dissipative floor covering.

FIG. 4 is a flowchart 16 of an exemplary method of creating a magnetically adhered, static dissipative floor covering 1. To create such a magnetically adhered, static dissipative floor covering 1, at first, in a step, a magnetically receptive floor surface 3 is provided. After that, in a step 20, the floor covering 1 is supplied provided, which comprises a plurality of static dissipative, magnetic floor tiles 4. In a step 22, the tiles (4) are held in place by magnetic interaction between the tiles (4) and the magnetically receptive surface (3).

Figure 3:
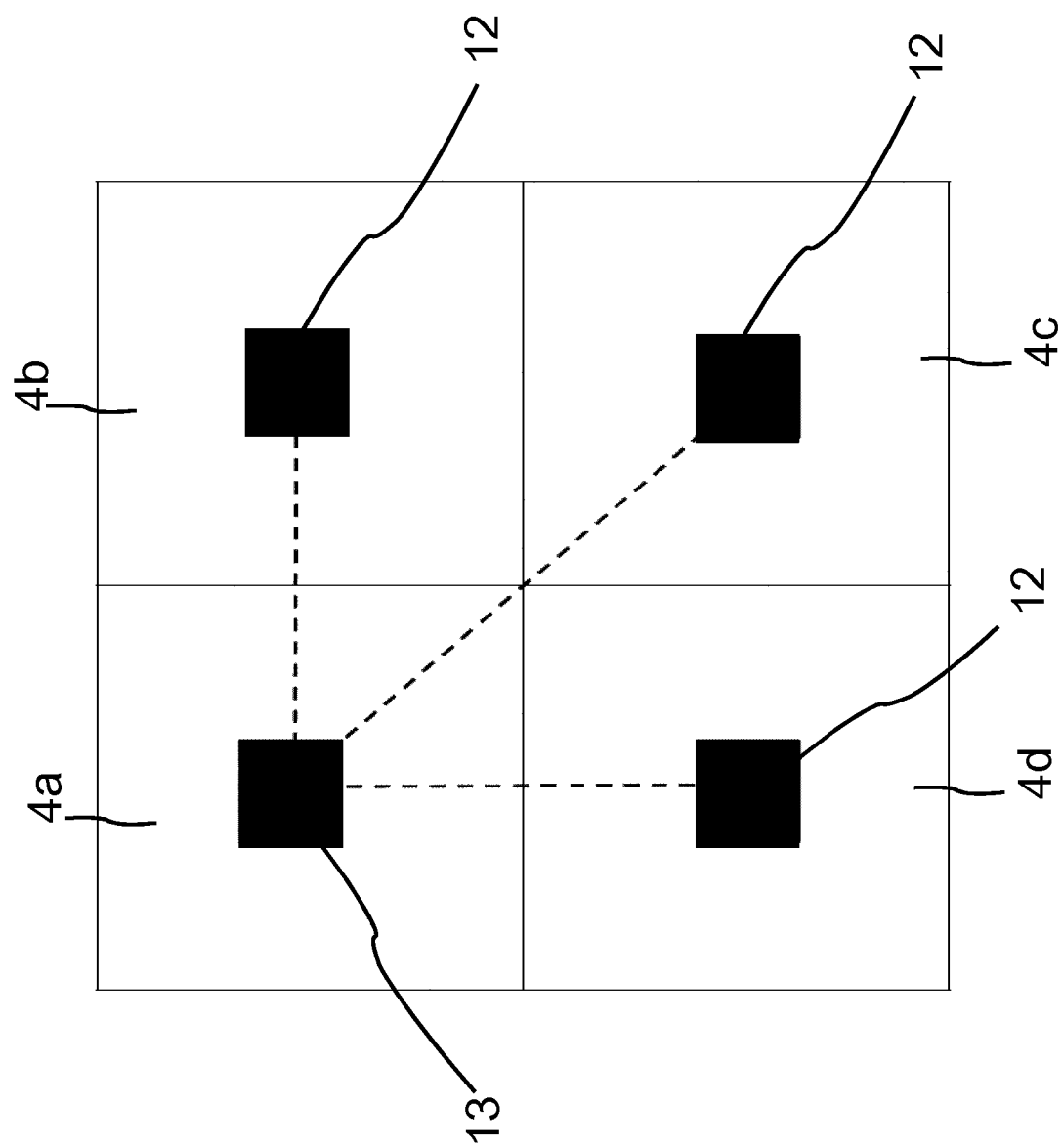
FIG. 3 a schematic view of a test arrangement for a floor covering according to the invention.

FIG. 3 shows a test arrangement for a floor covering according to the present invention to allow measurements of surface resistivity in a two-dimensional array, as per the ASTM D257 standard. The resistivity is measured on tiles 4b, 4c, 4d with respect to tile 4a by means of a test electrode 12 in respect to a reference electrode 13.

The following examples are given for illustrative purposes only and are not meant to be a limitation of the scope of protection defined by the claims.

Example 1

Four Statguard® 8432 ESD Vinyl Floor Tiles (300 mm×300 mm×3.2 mm) commercially sold by Desco Industries Inc. were coated on the underside with a conductive adhesive composition formed by blending 12 parts by weight of GS030P graphene powder available from Graphene Star Ltd. with 100 parts by weight of Magna Tak polyurethane adhesive from Thortex America Inc. The conductive adhesive composition was applied using a serrated edge comb and then lightly rolled with a short nap roller to provide a thickness of approximately 500 microns. After allowing to gel for 2 hours, KM 101G magnetic sheet received from Kingfine Magnetics Ltd. was applied to the conductive layer. The composite tiles were allowed to cure overnight and then affixed to marine ply boards which had previously been treated with MS 870 Magnetised Floor System from IOBAC Ltd. The tiles were butted against each other in a two-dimensional array and surface resistivity measurements, as per the ASTM D257 standard, undertaken on tiles 4b, 4c, 4d in turn with respect to tile 4a, as per FIG. 3 below.

Example 2

Four Statguard® 8432 ESD Vinyl Floor Tiles (300 mm×300 mm×3.2 mm) were coated on the underside with a conductive adhesive composition formed by blending 12 parts by weight of GS030P graphene powder commercially sold by Graphene Star Ltd. with 100 parts by weight of Magna Tak polyurethane adhesive. The conductive adhesive composition was applied using a serrated edge comb and then lightly rolled with a short nap roller to provide a thickness of approximately 500 microns. After allowing to gel for 2 hours, KM 501G magnetic sheet from Kingfine Magnetics Ltd. was applied to the conductive layer. The composite tiles were allowed to cure overnight and affixed to marine ply boards which had previously been treated with MS 870 Magnetised Floor System. The tiles were butted against each other in a two-dimensional array and surface resistivity measurements, as per the ASTM D257 standard, undertaken on tiles 4b, 4c, 4d in turn with respect to tile 4a, as per example 1.

Example 3

EMF RF Shielding Nickel Copper Fabric commercially sold by Faraday Defense was applied to the underside of four Statguard® 8432 ESD Vinyl Floor Tiles (300 mm×300 mm×3.2 mm). KMG 501G self-adhesive magnetic sheet was then affixed to the Nickel Copper fabric. The composite tiles were affixed to marine ply boards which had previously been treated with MS 870 Magnetised Floor System. The tiles were butted against each other in a two-dimensional array and surface resistivity measurements, as per the ASTM D257 standard, undertaken on tiles 4b, 4c, 4d in turn with respect to tile 4a, as per example 1.

Example 4

EMF RF Shielding Nickel Copper Fabric was applied to the underside of four Statguard® 8412 ESD Vinyl Floor Tiles (300 mm×300 mm×3.2 mm) commercially available from Desco Industries Ltd. KMG 101G self-adhesive magnetic sheet was then affixed to the Nickel Copper fabric. The composite tiles were affixed to marine ply boards which had previously been treated with MS 870 Magnetised Floor System. The tiles were butted against each other in a two-dimensional array and surface resistivity measurements, as per the ASTM D257 standard, undertaken on tiles 4b, 4c, 4d in turn with respect to tile 4a, as per example 1.

Example 5

EMF RF Shielding Nickel Copper Fabric was applied to the underside of four Statguard® 8412 ESD Vinyl Floor Tiles (300 mm×300 mm×3.2 mm). KMG 501G self-adhesive magnetic sheet was then affixed to the Nickel Copper fabric. The composite tiles were affixed to marine ply boards which had previously been treated with MS 870 Magnetised Floor System. The tiles were butted against each other in a two-dimensional array and surface resistivity measurements, as per the ASTM D257 standard, undertaken on tiles 4b, 4c, 4d in turn with respect to tile 4a, as per example 1.

The individual resistivity measurements recorded for Examples 1-5, as per the ASTM D257 standard, are detailed in Table 1 below.

| Example Number | Surface Resistivity Measurements (ohm · cm) | | |
|---|---|---|---|
| 1 | $5.0 \times 10^5$ | $5.1 \times 10^5$ | $4.8 \times 10^5$ |
| 2 | $5.2 \times 10^5$ | $5.5 \times 10^5$ | $5.1 \times 10^5$ |
| 3 | $1.0 \times 10^5$ | $1.2 \times 10^7$ | $1.2 \times 10^5$ |
| 4 | $3.3 \times 10^7$ | $3.7 \times 10^7$ | $3.6 \times 10^7$ |
| 5 | $3.5 \times 10^7$ | $3.5 \times 10^7$ | $3.8 \times 10^7$ |

REFERENCE CHARACTER LIST

1 Floor Covering
2 Substrate Floor
3 Magnetically receptive surface
4 Tile
4a, 4b, 4c, 4d Tile
5 Vinyl wearing layer
6 Conductive ground plane
7 Magnetic layer
8 Nickel-Copper fabric
9 Adhesive backing
10 Adhesive Layer
11 Person
12 Test electrode
13 Reference electrode

The invention claimed is:

1. A method of creating a magnetically adhered, static dissipative floor covering (1), the method comprising the steps of:
   providing a magnetically receptive floor surface (3);
   supplying a floor covering comprising a plurality of static dissipative, magnetic floor tiles (4); and
   holding the tiles (4) in place by magnetic interaction between the tiles (4) and the magnetically receptive surface (3);
   the floor tiles (4) being a composite construction comprising a) a static dissipative vinyl wearing layer (5), b) an integral, conductive ground plane (6) and c) an integral, planar magnetic layer (7),
   the conductive ground plane (6) comprising a non-woven synthetic fabric (8) with a nickel-copper coating and a conductive adhesive backing (9),
   the conductive ground plane (6) bonded to the static dissipative wearing layer (5) by the conductive adhesive backing (9).

2. The method according to claim 1, wherein the floor surface (3) is intrinsically magnetically receptive.

3. The method according to claim 1, wherein the floor surface (3) is provided with a magnetically receptive underlayment.

4. The method according to claim 3, wherein the magnetically receptive underlayment is formed by the application of a liquid coating composition comprising a polymeric binder and at least one of magnetic and magnetizable particles, wherein the at least one of magnetic and magnetizable particles are selected from at least one of paramagnetic, superparamagnetic and ferromagnetic substances selected from the group comprising iron, iron oxides, ferrosilicones or combinations thereof.

5. The method according to claim 4, wherein the polymeric binder of the coating composition comprises an air-drying resin.

6. The method according to claim 4, wherein the polymeric binder comprises a two-part thermosetting resin.

7. The method according to claim 1, wherein the static dissipative vinyl wearing layer (5) has at least one of a resistivity from $10^6$ ohm.cm to $10^9$ ohm.cm according to the ASTM D257 standard, and the static dissipative vinyl wearing layer (5) has a static decay time (5,000 volts-0 volts) of less than 0.10 seconds according to the Federal TM 101B, Method 4046 standard.

8. The method according to claim 1, wherein the static dissipative vinyl wearing layer (5) has at least one of a resistivity from $2.5 \times 10^4$ ohm.cm to $1 \times 10^6$ ohm.cm according to the ASTM D257 standard, and the static dissipative vinyl wearing layer (5) has a static decay time (5,000 volts-0 volts) of less than 0.03 seconds according to the Federal TM 101B, Method 4046 standard.

9. The method according to claim 1, wherein the conductive ground plane (6) comprises a conductive adhesive or a coating composition containing graphene powder.

10. The method according to claim 1, wherein the conductive ground plane (6) has a sheet resistivity from 0.01 ohm/sq. to 0.10 ohm/sq. according to the ASTM F390 standard.

11. The method according to claim 1, wherein the planar magnetic layer (7) comprises at least one of a flexible, polymeric magnetic sheet which is bonded to the conductive ground plane by an adhesive, a magnetic remanence from 0.10 Tesla, to 0.50 Tesla, and a magnetic coercivity from 39.750 A/m to 239.000 A/m.

12. The method according to claim 1, wherein the magnetically adhered, static dissipative floor covering system has at least one of a resistivity from $10^6$ ohm.cm to $10^9$ ohm.cm according to the ASTM D257 standard, and a static decay time (5,000 volts-0 volts) of less than 0.10 seconds according to the Federal TM 101B, Method 4046 standard.

13. The method according to claim 1, wherein the magnetically adhered, static dissipative floor covering system has at least one of a resistivity from $2.5 \times 10^4$ ohm.cm to $1 \times 10^6$ ohm.cm according to the ASTM D257 standard, and a static decay time (5,000 volts-0 volts) of less than 0.03 seconds according to the Federal TM 101B, Method 4046 standard.

* * * * *